July 16, 1957     R. POHLMAN     2,799,157
FLAW DETECTION DEVICE USING REFLECTED ULTRASONIC ACOUSTIC WAVES
Filed April 13, 1954     2 Sheets—Sheet 1

INVENTOR.
REIMAR POHLMAN
BY
AGENT

July 16, 1957 R. POHLMAN 2,799,157
FLAW DETECTION DEVICE USING REFLECTED ULTRASONIC ACOUSTIC WAVES
Filed April 13, 1954 2 Sheets-Sheet 2
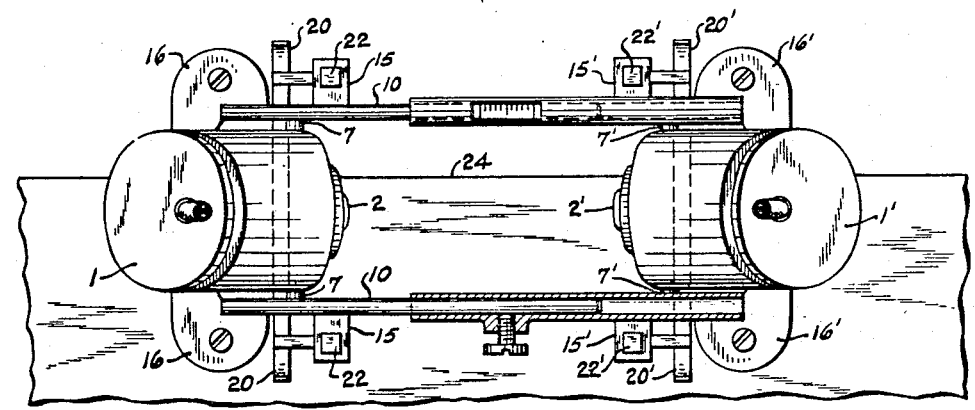
Fig. 4
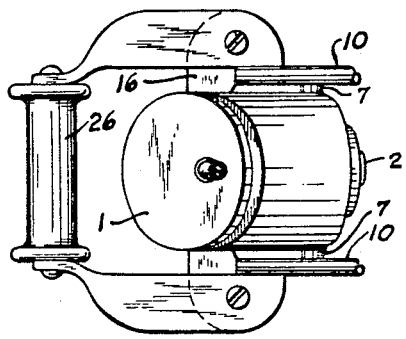
Fig. 5
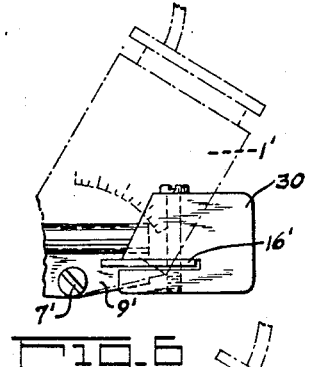
Fig. 6
Fig. 7
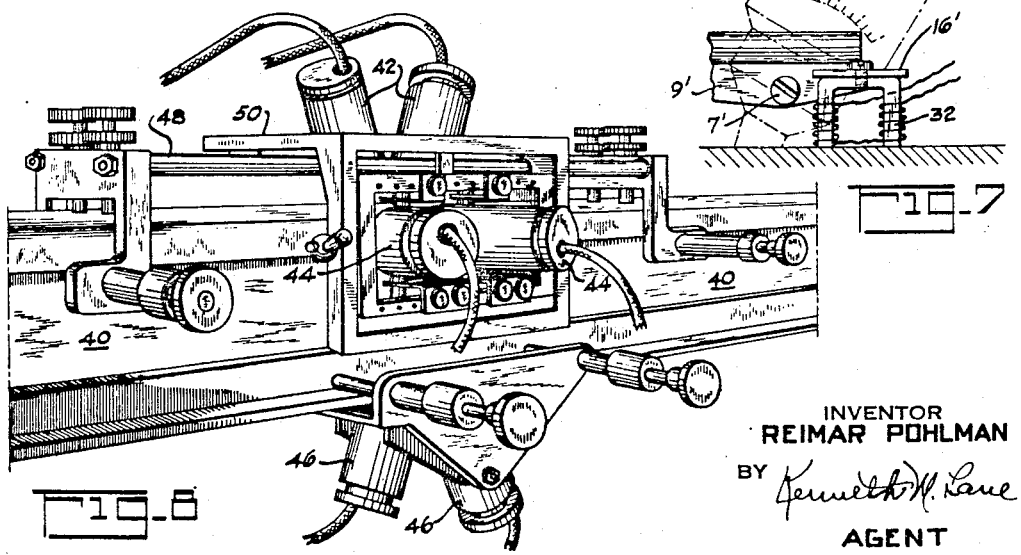
Fig. 8
INVENTOR
REIMAR POHLMAN
BY
AGENT

United States Patent Office 2,799,157
Patented July 16, 1957

2,799,157
FLAW DETECTION DEVICE USING REFLECTED ULTRASONIC ACOUSTIC WAVES

Reimar Pohlman, Zurich, Switzerland, assignor to Firma USAG, Ultraschall A. G., Zurich, Switzerland Application April 13, 1954, Serial No. 422,897

Claims priority, application Switzerland April 14, 1953

13 Claims. (Cl. 73—67.7)

The present invention relates to the testing of workpieces or specimens by means of reflected acoustic waves, and more particularly by means of acoustic waves in the superaudible frequency range. Any flaw or other defect in the specimen under test will appear as an impedance irregularity in the transmission path of the acoustic waves.

An object of the invention is the provision of a movable support for the transmitting and receiving transducers which will permit the transducers to be moved relative to the specimen while in resilient engagement with its surface.

Another object of the invention is to provide means for adjusting the angle of propagation and the angle of reception of the acoustic waves to obtain a reflection from the far surface of the material.

A further object of the invention is to provide means for varying the spacing between the transmitting and receiving transducers.

Still another object of the invention is to provide calibrated protractor scales whereby the angle of transmission and the angle of reception may be determined, together with a further calibrated linear scale for determining the distance between the transmitting and receiving transducers.

Other and further objects and advantages of the invention will become apparent upon reading the following specification, together with the accompanying drawing forming a part hereof.

Referring to the drawing:

Fig. 4 is a view similar to Fig. 3 but illustrating a modified construction.

Figs. 5, 6 and 7 are partial views illustrating the addition of handles, weights and magnets, respectively, to the device.

Fig. 8 is a perspective view illustrating apparatus embodying a plurality of pairs of transducers.

Figure 1:
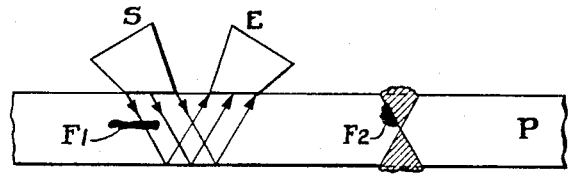
Figure 1 is a diagrammatic sectional view in side elevation illustrating the transmission path of the reflected acoustic waves.

Referring to Fig. 1, the device comprises a transmitting transducer S which is resiliently pressed into engagement with the upper surface of a specimen under test. The accoustic waves travel downwardly obliquely to the right through the test specimen to its lower surface The change in acoustic impedance at the boundary between the lower surface of the test specimen and the air causes a reflection of accoustic waves obliquely upwardly to the right, as indicated by the arrows. Upon reaching the upper surface of the test specimen, the intensity of the reflected waves is measured by the receiving transducer E and conventional measuring apparatus associated therewith but omitted from the drawing for simplicity of illustration.

As the transducers S and E are moved along the upper surface of the test specimen, a flaw in the material shown as $F_1$ will become included in the transmission path of the acoustic waves from transmitting transducer S to receiving transducer E and will cause a change in the transmission loss through this path. This change will be detected by the measuring apparatus including the receiving transducer E and will thus indicate the presence of the flaw $F_1$.

At the right, in Fig. 1, there is shown a welded joint with rough and irregular exposed surfaces. By placing the transmitting and receiving transducers S and E on opposite sides of the welded joint, and moving them longitudinally along the joint, the flaw $F_2$ will manifest its presence by a change in the transmission loss through the test specimen including the welded joint. In this connection, the transducers must be so arranged that reflection takes place from the smooth lower surface of the test specimen and not from the rough and irregular lower surface of the welded joint.

Figure 2:
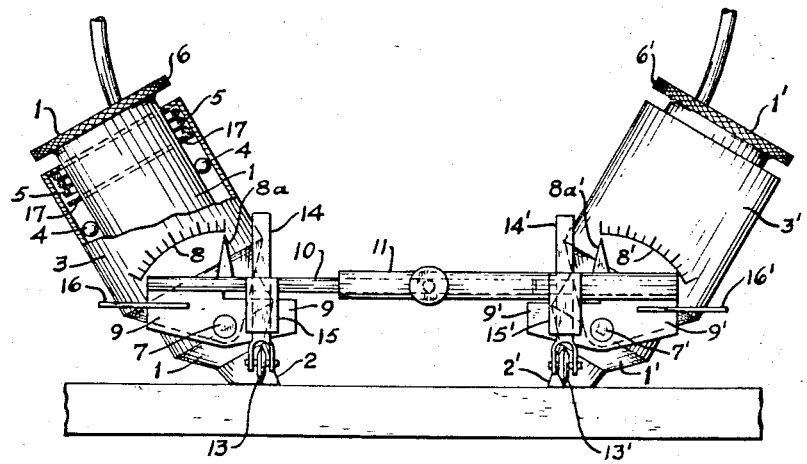
Figure 2 is a view in side elevation partly in section, of an embodiment of the invention.
Figure 3:
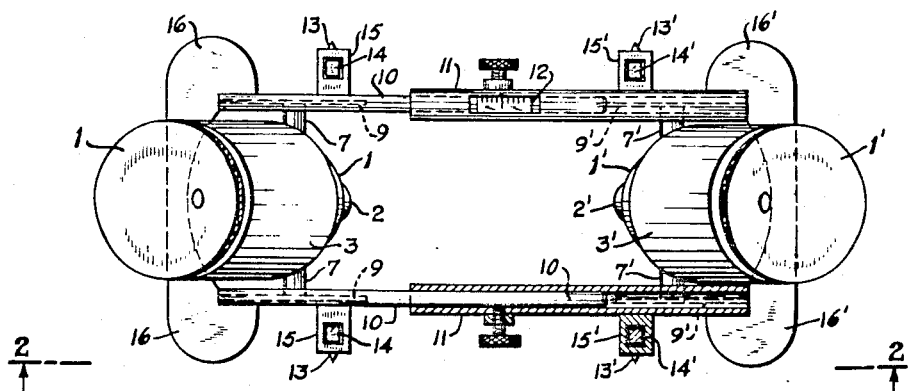
Figure 3 is a plan view, partly in section, of the embodiment illustrated in Fig. 2.

Referring to Figs. 2 and 3, the transmitting transducer comprises a cylindrical body 1 and a specimen engaging member 2 having a lower contact surface from which the acoustic vibrations are imparted to the test specimen. The receiving transducer 1 is similar in all respects to the transmitting transducer. The receiving transducer is located at the right in Figs. 2 and 3, and parts corresponding to similar parts of the transmitting transducer are identified by a prime ('). The contact surface of the specimen engaging member 2 is illustratively shown as a plane directed obliquely with respect to the longitudinal axis of the body 1. The body 1 is longitudinally slidable in an outer supporting tube 3. Ball bearings 4 are interposed between body 1 and tube 3 to reduce sliding friction and to maintain accurate alignment of the body 1. A helical compression spring 5 has its lower end in yielding engagement with a flange 17 formed on body 1 and its upper end in engagement with the upper end of outer tube 3 thereby pressing body 1 downwardly and to the right as viewed in Fig. 2. The body 1 is rotatably mounted in tube 3 and may be turned with respect to tube 3 by means of a knurled ring 6 to adjust the oblique contact surface of the specimen engaging member 2 for maximum effective contact with the upper surface of the test specimen.

The specimen engaging member 2 is interchangeable with other specimen engaging members having plane surfaces of different angles of obliqueness, convex or concave cylindrical or spherical surfaces, or any other configuration of contact surface suited for engagement with surface of the particular specimen under test.

The supporting tube 3 is pivoted in a pair of bearings 7 to permit its angle of inclination to be varied, this angle being readable on a calibrated protractor scale 8 on said supporting tube in cooperation with an index pointer 8a on the bearing supporting structure. Pivot bearings 7 are located as closely as possible to the surface of the specimen under test. Pivot bearings 7 are mounted in a pair of plates 9, each of the plates 9 being welded to the left end portion of one of a pair of horizontal rods 10. Each of the rods 10 is longitudinally slidable in a tube 11. A calibrated scale 12 on one of the rods 10 may be read through a cooperating window formed in one of the tubes 11. The calibrated scale 12 indicates the horizontal distance between the transmitting and receiving transducers. Fixed to the right hand end portions of tubes 11 are a pair of plates 9' with bearings 7' for the receiving transducer. The pivotal axes defined by bearings 7 and bearings 7' are parallel to each other.

The device is supported on four sharp-edged wheels 13 and 13' which are journaled in the lower bifurcated ends of vertical rods 14 and 14'. A line joining the points of contact of the sharp edged wheels 13 with the upper surface of the specimen passes substantially through the center of the area of contact of member 2 with the upper surface of the specimen. A similar situation prevails with respect to wheels 13' for the receiving transducer. The rods 14 are of square cross-section and are vertically adjustable in guides 15 fixed to the rods 10. The rods 14' are similarly vertically adjustable in guides 15' fixed to the tubes 11. By removing the rods 14 and 14' and replacing them turned through an angle of 90°, the device may be made longitudinally movable to the right or left along the specimen instead of transversely movable as shown in Fig. 3. It will be noted that the spacing between wheels 13 and wheels 13' varies in accordance with the spacing between the transmitting and receiving transducers.

When it is desired to move the device up to the extreme edge of the specimen, the wheels 13, 13' and rods 14, 14' may as illustrated in Fig. 4 be replaced by some other suitable supporting structure such as a frame comprising runners 20, the runner frame including vertical portions 22 which are engaged within the guides 15, 15', the frame being so arranged that a portion of the testing device may overhang the edge 24 of the specimen.

In order to make the testing device adaptable to unevenness in the surface of the specimen, the frame portion which comprises rods 10 and tubes 11 provides a relatively small amount of torsional rigidity with respect to the longitudinal axis of the device. Horizontal end plates 16 and 16' are provided to permit the manual application of pressure to twist the frame so that good contact may be established with the test piece, notwithstanding unevenness in the upper surface of the test specimen.

The device described above is not only suitable for the detection of longitudinal cracks, but may also be used to detect transverse cracks or for the inspection of welded seams in pipes of widely varying diameters. It may also be used for the inspection of concave surfaces, such as the examination of internal welded joints in boilers, tanks and the like.

With the wheels 13, 13' arranged for longitudinal movement along a line joining the transducers, the depth of cracks in the specimen may be explored.

For ease in handling there can also be provided lateral handles 26, as illustrated in Fig. 5, which make it possible to press the device against the specimen. It is advisable to provide handles which are readily detachable inasmuch as frquently it is necessary to carry out inspections in very restricted spaces, for instance between boiler bolts, etc., where any needless extension is undesirable.

When placing the aparatus on the specimen it is frequently found that the device lifts away from the specimen due to the pressure of compression springs 5. Increasing the weight of the device which would easily overcome this drawback but is disadvantageous should it be necessary to inspect overhead or vertical surfaces. The device can therefore be provided with removable weights 30 as shown in Fig. 6 or also with magnets 32 as shown in Fig. 7, in the latter case the magnets being possibly so dimensioned that they substantially support the force exerted by the compression springs 5 or else make such force entirely unnecessary.

The apparatus described need not be limited to the use of a single pair of transducers, but utilizing the above-described basic concept, a plurality of pairs of transducers can be provided, arranged in a manner corresponding to the shape and test conditions of the specimen in question. For instance, as illustrated in Fig. 8 for the rapid inspection of a butt-welded joint in the rail 40, there are used three pairs of transducers 42, 44 and 46 of which the transducers 42 and 44 are mounted on a common frame 50 slidable along guide rods or rails 48 secured to the rail 40, whereby the rail-head and rail-neck are inspected by vertical V-shaped radiation from above by the pair of transducers 42, the rail-head by horizontal V-shaped radiation in transverse direction by the transducers 44 and the welded joint of the rail-foot by a V-shaped radiation from below by the transducers 46.

It will be apparent to those skilled in the art that many changes and modifications may be made in the specific illustrative embodiments of the invention which are herein shown and described without departing from the scope of the invention as defined in the appended claims.

What is claimed is:

1. An acoustic testing device of the class described, comprising: a transmitting transducer for propagating acoustic waves in a specimen to be inspected, said transmitting transducer comprising a portion engageable with a first surface of said specimen to direct said acoustic waves toward a second surface of said specimen spaced from said first surface for reflection from said second surface back to said first surface; a receiving transducer spaced from said transmitting transducer for receiving and determining the intensity of acoustic waves propagated by said transmitting transducer and reflected from said second surface, said receiving transducer comprising a portion engageable with said first surface; supporting means in which said transducers are pivotally mounted for angular adjustment about parallel axes of pivotal movement; said transmitting and said receiving transducer each having a member with a scale thereon, pointer elements attached to said supporting means for indicating the angular positions of said transducers on said scale; a pair of relatively adjustable members included in said supporting means, for varying said spacing between said transducers, one of said last-named members being provided with scale graduations, the other of said members being provided with an index line for determining the magnitude of said spacing; means yieldingly urging each said surface engaging portions of said transducers into engagement with said first surface of said specimen; and wheels operatively associated with said supporting means for permitting relative movement between said supporting means and said first surface of said specimen with said transducers in fixed positions relative to each other and in yielding engagement with said first surface.

2. A testing device according to claim 1, in which said means permitting relative movement between said specimen and said supporting means comprises first and second pairs of wheels in contact with said first surface, a line joining the points of contact of said first pair of wheels with said first surface passing substantially through the center of the area of contact between said surface engaging portion of transmitting transducer and said first surface; and a line joining the points of contact of said second pair of wheels with said first surface passing substantially through the center of the area of contact between said surface engaging portion of said receiving transducer and said first surface, said first pair of wheels remaining fixed with respect to said transmitting transducer and said second pair of wheels remaining fixed with respect to said receiving transducer notwithstanding variations in the spacing between said transducers.

3. A testing device according to claim 1, in which said means permitting relative movement between said specimen and said supporting means comprises a plurality of wheels, said wheels being adjustable to permit variation in the direction of said relative movement and being further adjustable to vary the spacing between said supporting means and said first surface.

4. A testing device according to claim 1, wherein said supporting means is of low torsional rigidity with respect to a line joining said transducing means, whereby said supporting means adapts itself to irregularities in said first surface in the course of said relative movement.

5. A testing device according to claim 1, in which said parallel pivotal axes are located as closely as possible to said first surface.

6. A testing device according to claim 1, in which said transducers comprise cylindrical bodies slidably disposed within tubular supporting members; anti-friction bearing means interposed between said bodies and said tubular supporting members; and wherein said means yieldingly urging said surface engaging portions of said transducers into engagement with said first surface urges said bodies longitudinally outwardly of said tubular supporting members toward said first surface.

7. A testing device according to claim 6, in which said bodies are rotatably disposed in said tubular supporting means for rotation about their respective longitudinal axes.

8. A testing device according to claim 1, in which said portions of said transducers engageable with said first surface are interchangeably removable for replacement by other portions of different surface configurations adapted for engagement with specimens of different surface shapes.

9. A device according to claim 1, in which said means for varying said spacing between said transducers comprises a pair of tubes and a pair of rods longitudinally slidably disposed in said tubes.

10. A testing device according to claim 1, wherein said specimen is magnetizable, said supporting means further comprising magnetic means acting on said specimen and urging said supporting means toward said specimen.

11. A testing device according to claim 1, further comprising detachable handles carried by said supporting means for pressing said supporting means toward said first surface.

12. A testing device according to claim 1, further comprising rail members along which said supporting means is movable.

13. An acoustic testing device of the class described comprising a transmitting transducer for propagating acoustic waves in a specimen to be inspected, said transmitting transducer having a portion engageable with a first surface of said specimen to direct said acoustic waves toward a second surface of said specimen spaced from said first surface for reflection from said second surface back to said first surface; a receiving transducer spaced from said transmitting transducer and having a portion engageable with said first surface for receiving and determining the intensity of acoustic waves propagated by said transmitting transducer and reflected from said second surface; supporting means in which said transducers are pivotally mounted for angular adjustment about parallel axes of pivotal movement; means included in said supporting means adjustably connecting said transducers for varying the spacing between said transducers; and means operatively connected to said supporting means for permitting relative movement between said supporting means and said first surface of said specimen with said transducers in fixed positions relative to each other and in yielding engagement with said first surface.

References Cited in the file of this patent

UNITED STATES PATENTS

| | | |
|---|---|---|
| 2,602,102 | Web | July 1, 1952 |
| 2,660,054 | Pringle | Nov. 24, 1953 |

FOREIGN PATENTS

| | | |
|---|---|---|
| 889,840 | Germany | Sept. 14, 1953 |